[11] 3,623,791

[72] Inventor Toshifumi Uetake
Tokyo, Japan
[21] Appl. No. 1,415
[22] Filed Jan. 8, 1970
[45] Patented Nov. 30, 1971
[73] Assignee Olympus Optical Co., Ltd.
Tokyo, Japan

[54] ULTRAWIDE FIELD EYEPIECE
1 Claim, 6 Drawing Figs.
[52] U.S. Cl. ..................................... 350/220,
350/175 E
[51] Int. Cl. ..................................... G02b 9/34,
G02b 25/04
[50] Field of Search .......................... 350/220,
175 E

[56] References Cited
UNITED STATES PATENTS
3,384,434  5/1968  Scidmore et al. ............. 350/220 X

*Primary Examiner*—John K. Corbin
*Attorney*—Kelman and Berman

ABSTRACT: Ultrawide field eyepiece for a microscope having field lens elements and eyelens elements spaced a distance behind the field lens element with an airgap therebetween. The field lens elements comprise doublet lens elements having cemented achromatic surfaces and positive refractive power as a whole. The eye lens elements comprise thick meniscus lens elements having cemented surfaces of negative refractive power and lens element(s) of positive refractive power spaced a short distance from the thick meniscus lens elements behind the same. The foremost concave surface of the meniscus lens elements is directed toward the objective lens to be used together. The radius of curvature of the front convex surface of the rear convex lens element forming a part of the meniscus lens elements, the difference in the refractive index between the front and rear lens elements of the meniscus lens elements, the difference in the Abbe's number between the front and rear lens elements of the field lens elements, and the distance between the field lens elements and the eyelens elements satisfy certain predetermined conditions, respectively, so that ultrawide field is obtained while the eyepoint distance is made appropriately great and the missing of light in the marginal annular region of the field of view is prevented.

SPHERICAL ABERRATION

CHROMATIC ABERRATION OF MAGNIFICATION

ASTIGMATISM AND CURVATURE OF FIELD

DISTORTION

SPHERICAL ABBERRATION OF PUPIL

ULTRAWIDE FIELD EYEPIECE

BACKGROUND OF THE INVENTION

The present invention relates to an ultrawide field eyepiece for a microscope, and more particularly, to an ultrawide field eyepiece having a high field number and a great eye point distance while the missing or lack of the light in the marginal annular region of the field of view is widely avoided.

In general in a wide filed eyepiece, missing or lack of the light in the marginal annular region of the field of view takes place unless the spherical aberration of the image of the exit pupil of the objective lens appearing at the eyepoint of the eyepiece used with the eyepiece is sufficiently avoided. This is due to the fact that the diameter of the exit pupil of the objective lens is relatively small and, hence, the diameter of the exit pupil at the eyepoint of the eyepiece is in general made small in the order of 1 mm. while the field of view is very bright and, therefore, the diameter of the pupil of the operator of the microscope is necessarily reduced, so that the missing or lack of the light in the marginal annular region of the field of view will take place if some spherical aberration, even though it is small, exists. Therefore, it is required to sufficiently compensate for the spherical aberration in order to avoid the missing of light at the marginal region of the field of view.

Further, it is necessary to locate the field lens of an eyepiece in front of the eyelens thereof an appropriate distance spaced therefrom in order to catch the principal light rays diverging from the objective lens and introduce into the sleeve of the eyepiece having a limited diameter. Therefore, in a wide field eyepiece, the eyepoint distance tends to be made small. The eye point distance is in general said to be sufficient if it exceeds 6 mm., i.e., the average length of the eyelashes of a human being. On the other hand, if the eyepoint distance is too great, it will be made difficult for the operator to observe the image stably due to the unsteady movement of the head of the operator. Thus, the upper limit of the eyepoint distance should not exceed 20 mm. and the appropriate eyepoint distance is said to be in the order of 14–15 mm.

When a wide field eyepiece is used in a microscope mounting an objective lens of high magnification, it is necessary to give the eyepiece an overcorrection of the chromatic aberration of magnification so that the undercorrection of the chromatic aberration of magnification inevitably remaining in the high magnification objective lens.

The present invention aims at providing a novel and useful ultrawide field eyepiece for a microscope with the above-described problems of the prior art eyepiece being taken into consideration.

SUMMARY OF THE INVENTION

An object of the present invention is to provide a novel and useful ultrawide field eyepiece for a microscope which has a great field number and a great eyepoint distance while missing or lack of light in the marginal annular region of the field of view is widely avoided.

Another object of the present invention is to provide a novel and useful ultrawide field eyepiece of the type described above which is simple in construction and yet provides high quality of the image to be viewed thereby.

The above objects of the present invention are achieved in accordance with the present invention by the provision of an eyepiece having field lens elements and eye lens elements located behind the field lens elements a distance spaced therefrom with an airgap provided therebetween, the field lens elements comprising doublet lens elements having cemented achromatic surfaces and positive refractive power as a whole, the eyelens elements comprising thick meniscus lens elements consisting of a front negative lens element and a rear positive lens element cemented to each other, the cemented surfaces thereof being of negative refractive power, the front concave surface of the front negative lens element being directed toward the objective lens to be used together, as well as lens element(s) of positive refractive power spaced a short distance from the thick meniscus lens elements behind the same, and that the radius of curvature of the front convex surface of the rear positive lens element forming a part of the thick meniscus lens elements is selected to be in the range from 0.5 times the focal length of the entire optical system of the eyepiece to 0.8 times the same focal length, the refractive index of the front lens element of the thick meniscus lens element being selected to be greater than that of the rear lens element by at least 0.1, the Abbe's number of the front lens element of the field lens elements being selected to be greater than that of the rear lens element thereof by at least 20, while the airgap between the field lens elements and the eye lens elements is selected to be in the range from 0.7 times the focal length of the entire optical system of the eyepiece to 1.5 times the same focal length.

In the eyepiece constructed in accordance with the present invention as described above, since the field lens elements in the form of doublet lens elements having achromatic cemented surfaces and positive refracting power as a whole are provided, principal light rays diverging from the exit pupil of the objective lens used with the eyepiece at greater angles with respect to the optical axis can be caught by the field lens elements thereby permitting substantially wide field to be observed.

In order to make it possible to compensate for chromatic aberration of magnification as well as distortion, the cemented surfaces of the meniscus lens elements of the present invention are made of negative refractive power. If they are not of negative refractive power, the chromatic aberration of magnification and the distortion cannot be corrected. The use of the meniscus lens elements in the present invention is extremely effective for elongating the eyepoint distance and, at the same time, for compensating for the curvature of field of the entire lens system of the eyepiece. The provision of lens element(s) having positive refractive power behind the meniscus lens elements a short distance spaced therefrom with an airgap existing therebetween is indispensable to requirements in the present invention in order to maintain the focal length of the entire lens system of the eyepiece in a predetermined positive value. And, by the provision of such positive lens element(s), the astigmatism resulting from the provision of the thick meniscus lens elements located immediately in front of the positive lens element(s) can be compensated for.

The eyepiece has the numerical data shown in table 1 hereinbelow.

DETAILED DESCRIPTION OF THE PREFERRED EMBODIMENT

Figure 1:
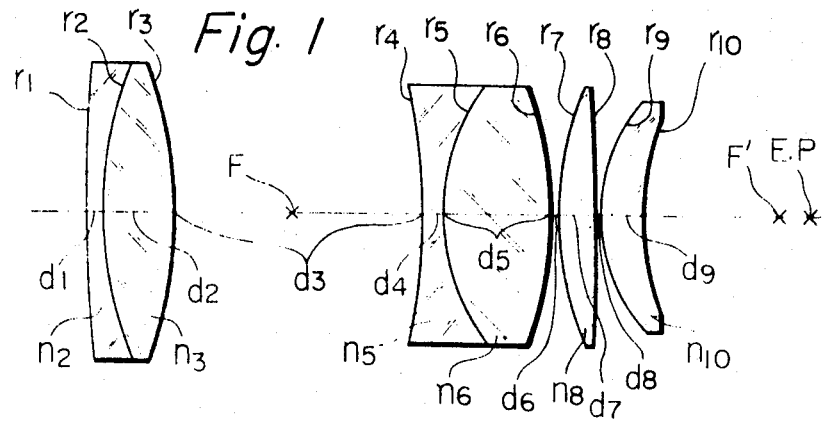
FIG. 1 is a schematic longitudinal sectional view showing the arrangement of the lens elements of the present invention.

Referring to FIG. 1, the object side is shown as being to the left. The field lens elements in the form of cemented doublet lens elements having positive refractive power are located at the foremost position. The field lens elements comprise a front negative lens element having the Abbe's number $\nu 2$ and a rear positive lens element having the Abbe's number $\nu 3$. The value of $\nu 2$ is selected to be greater than that of $\nu 3$ by at least 20.

Thick meniscus lens elements are arranged behind the field lens elements with an airgap $d3$ provided therebetween. The airgap $d3$ is selected to be in the range of 70–150 percent of the focal length F of the entire lens system of the eyepiece. The meniscus lens elements comprise a front concave lens element and a rear convex lens element cemented to each other so that the meniscus lens elements have cemented surfaces of negative refractive power. The front concave surface of the front concave lens element is directed toward the objective lens to be used together. In accordance with the present invention, the radius of curvature $r5$ of the front convex surface of the rear convex lens element forming a part of the meniscus lens elements is selected to be in the range of 50-80 percent of the focal length F of the entire lens system of the eyepiece. Further, the refractive index $n5$ of the front concave lens element of the meniscus lens elements is selected to be greater than the refractive index $n6$ of the rear concave lens element by at least 0.1. Lens element(s) having positive refractive power are located behind the meniscus lens elements with a relatively small airgap $d6$ provided therebetween.

The numerical data of the eyepiece shown in FIG. 1 are shown in table 1 below.

Table 1

Wide Field Eyepiece

|  | r | d | nd | vd |
|---|---|---|---|---|
| 1 | 161 | 1.5 | 1 | |
| 2 | 30.0 | 6.5 | 1.6204 | 60.3 |
| 3 | −48.7 | 22.0 | 1.6259 | 35.6 |
| 4 | −51.9 | 1.8 | 1 | |
| 5 | 16.9 | 9.8 | 1.7174 | 29.5 |
| 6 | −30.7 | 0.3 | 1.5891 | 61.2 |
| 7 | 30.7 | 3.5 | 1 | |
| 8 | −240.3 | 0.3 | 1.5891 | 61.2 |
| 9 | 15.0 | 3.5 | 1 | |
| 10 | 28.8 | | 1.5891 | 61.2 |
| 11 | | | 1 | |

Focal Length $F=25.0$
Field Number = 26.0
Magnification = 10X
Eye Point Distance E.P. = 14.6

The symbol $r$ designates the radius of curvature, $d$ the thickness of the lens element or the airgap, $nd$ the refractive index of the lens element, and $vd$ the Abbe's number of the lens element, the numerals at the left hand column designating the order of the arrangement beginning at the object side.

Field number of 26.0 of the present invention is extremely great in an eyepiece having the focal length $F=25.0$ and the magnification of 10X in contrast to the prior art eyepiece of the same class having merely the field number of 18.0. Therefore, the area of the filed of view is enlarged by the present invention about twice the area of field of view which can be observed by the prior art eyepiece. Further, the eye point distance is 14.6 mm. which is appropriate for the observation of the image.

FIGS. 2-6 shows the various aberration curves of the eyepiece shown in FIG. 1.

Figure 2:
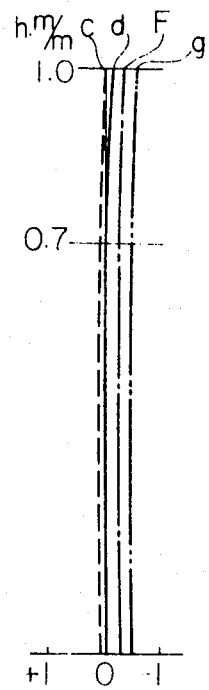
FIGS. 2 to 6 are graphs showing respectively various aberration curves of the eyepiece of FIG. 1.
Figure 3:
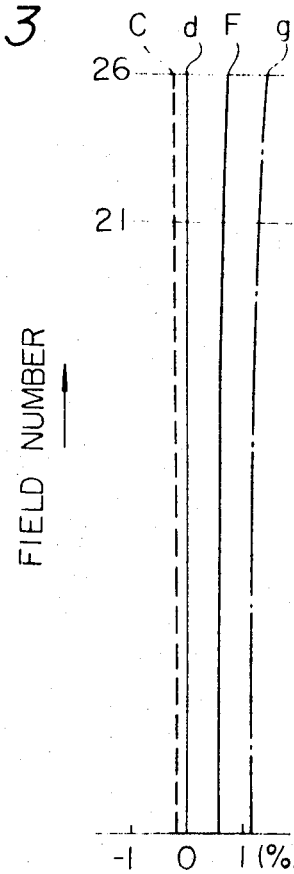
Figure 4:
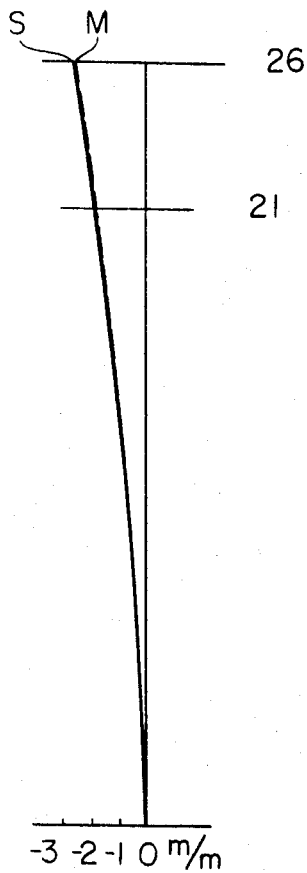
Figure 5:
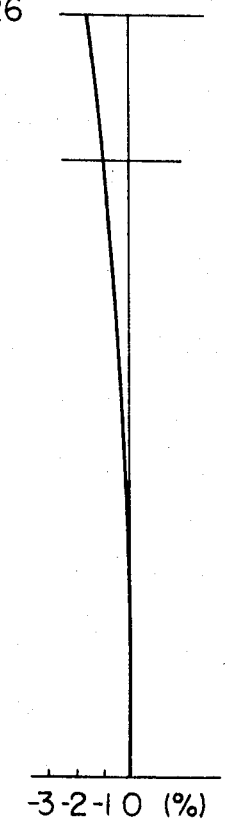

In FIG. 2 showing the spherical aberrations, the solid line shows the aberration for $d$-line, the broken line that of $c$-line, the single dot chain line that for F-line while the spherical aberration for $g$-line is shown by two dot chain line. FIG. 3 shows the chromatic aberration of magnification, and FIG. 4 shows the astigmatism and curvature of field while FIG. 5 shows the distortion. As is evident from the aberrations shown in FIGS. 2-5, the spherical aberration is extremely compensated for, while overcorrection of chromatic aberration of magnification is given to the eyepiece so that the undercorrection of chromatic aberration of magnification remaining in the objective lens is properly compensated for. The astigmatism as well as the curvature of field is reduced within 3 mm. over the wide field reaching the field number of 26. Also, the distortion is reduced within 2 percent.

Figure 6:
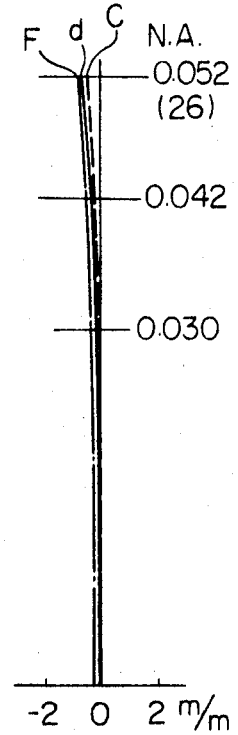

FIG. 6 shows the spherical aberration of pupil. The spherical aberration is reduced within about 1 mm. in the range of field number of 26, and missing or lack of light in the marginal annular region of the field is sufficiently avoided. The numerical aperture N.A. is 0.052 at the field number of 26, thus permitting the numerical aperture to be reduced.

As described above, it is evident that the present invention provides a novel and useful eyepiece in which the field number is very great and the eyepoint distance is sufficiently great while the missing of light in the marginal annular region of the field is widely eliminated.

I claim:

1. Ultrawide field eyepiece for a microscope having field lens elements and eyelens elements located behind said field lens elements a distance spaced therefrom with an airgap therebetween, wherein the field lens elements comprise doublet lens elements having cemented achromatic surfaces and positive refraction power as a whole and said eyelens elements comprise thick meniscus lens elements consisting of a front negative lens element and a rear positive lens element cemented to each other, the cemented surfaces thereof being of negative refractive power, as well as lens elements of positive refractive power spaced a short distance from said thick meniscus lens elements behind the same, the eyepiece having the following numerical data:

$F=25.0$ \qquad Field Number = 26.0
Magnification = 10X \qquad Eye Point = 14.6

|  | r | d | nd | vd |
|---|---|---|---|---|
| 1 | 161 | 1.5 | 1 | |
| 2 | 30.0 | 6.5 | 1.6204 | 60.3 |
| 3 | −48.7 | 22.0 | 1.6259 | 35.6 |
| 4 | −51.9 | 1.8 | 1 | |
| 5 | 16.9 | 9.8 | 1.7174 | 29.5 |
| 6 | −30.7 | 0.3 | 1.5891 | 61.2 |
| 7 | 30.7 | 3.5 | 1 | |
| 8 | −240.3 | 0.3 | 1.5891 | 61.2 |
| 9 | 15.0 | 3.5 | 1 | |
| 10 | 28.8 | | 1.5891 | 61.2 |
| 11 | | | 1 | | where $r$, $d$, $nd$ and $vd$ designate respectively the radius of curvature, the thickness of the respective lens element or the respective airgap, the refractive index and Abbe's number of the respective lens element in the order beginning at the front end of the eyepiece, the numerals at the left side column showing the order of arrangement of the lens element, as shown in FIG. 1, and F designates the focal length of the entire optical system of the eyepiece.

* * * * *